(No Model.)
S. ELLIOTT.
WHEEL TIRE AND RIM.
No. 440,702. Patented Nov. 18, 1890.
Fig. 1.
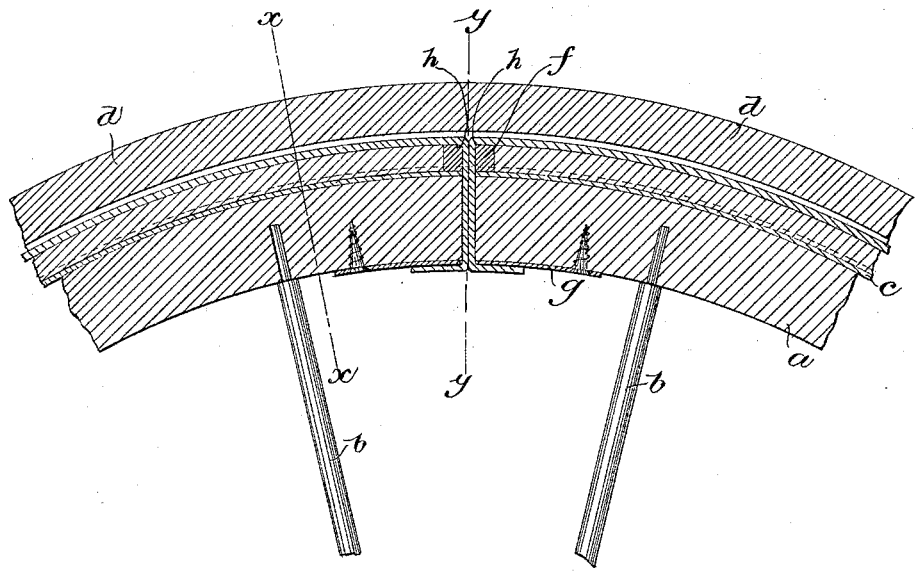
Fig. 2. Fig. 3.
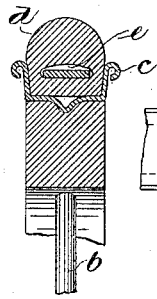 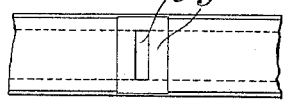 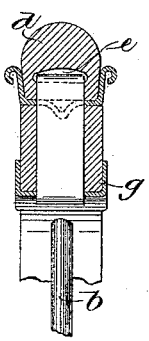
Fig. 4.
Witnesses: Inventor:
Fred. L. Greenleaf Sterling Elliott.
Frederick L. Emery. by Lemby Gregory
attys.

UNITED STATES PATENT OFFICE.

STERLING ELLIOTT, OF NEWTON, MASSACHUSETTS.

WHEEL TIRE AND RIM.

SPECIFICATION forming part of Letters Patent No. 440,702, dated November 18, 1890.

Application filed December 8, 1888. Serial No. 292,966. (No model.)

*To all whom it may concern:*

Be it known that I, STERLING ELLIOTT, of Newton, county of Middlesex, State of Massachusetts, have invented an Improvement in Means for Attaching Rubber Tires, of which the following description, in connection with the accompanying drawings, is a specification, like letters on the drawings representing like parts.

This invention has for its object to provide improved means for securing rubber tires to wheels.

In accordance with this invention the rubber tire is formed as a tubular strip or one having a continuous unobstructed opening through it from end to end, said opening being oblong in cross-section. The rubber tire is cut away on one side, preferably at a point opposite to which its ends are joined in forming the tire to establish communication with the opening, and a metallic block is placed in this cut-away portion, substantially fitting it. This metallic block has a hole or passage through it in a radial line toward the hub of the wheel, the side walls of said hole at the opening in the tire presenting rigid shoulders, which constitute bearing-surfaces. The shoulders or bearing-surfaces are slightly rounded. A long slender flat strip of steel or other suitable material is inserted at the cut-away portion and made to follow along and entirely through the opening in the tire. The two ends of the steel or other metallic strip passing through the metallic block sunken in the tire are accessible to be grasped by hand or by any mechanical device and drawn through a slot or passage formed in the felly, preferably at a point between the usual clips. A slot will be formed in the clip and the ends of the strip will be drawn therethrough and turned over upon and secured to the said clip, or it may be to the inner side of the felly. In practice the steel or other metallic strip will be drawn taut by some mechanical device; but it may be drawn by hand.

Figure 1 shows a longitudinal section of a portion of the felly and tire of a wheel attached or secured by means embodying this invention; Fig. 2, a cross-section of the felly and tire, taken on the dotted line $x\ x$, Fig. 1; Fig. 3, a cross-section of the felly and tire, taken on the dotted line $y\ y$; and Fig. 4, an under side view of the tire provided with the metallic block, to be referred to.

The felly $a$, the spokes $b$ of the wheel having any suitable hub, and the metallic trough-shaped rim are similar to that shown in my application, Serial No. 280,022, filed July 16, 1888.

The rubber tire $d$ is formed as tubular or with an opening $e$ through it from end to end, said opening being oblong in cross-section. The inner side of the rubber tire $d$, at a point preferably opposite the point where its ends are joined, is cut away, communicating with the opening $e$, and a metallic block $f$ is fitted in said opening, said block $f$ having a slot or passage $f'$ through it in a radial line toward the hub. The side walls of the slot $f'$ at the end next the opening in the tire are rounded and present rigid shoulders $h\ h$, which constitute bearing-surfaces. The metallic trough $c$, the felly $a$, and the clip $g$ have each a slot registering with the slot $f'$. A long slender flat strip of steel or other suitable material is inserted at the slot $f'$ and made to follow along and entirely through the opening $e$ in the tire until its forward end is accessible at the opening. The two ends of the strip are thereafter drawn as tightly as possible, drawing the strip in the opening $e$ taut and binding the rubber tire firmly in place. The outer or free ends of the strip are then turned over upon and soldered or otherwise secured to the inner side of the clip or felly. By this means the rubber tire may be speedily and very firmly secured in position, and will not become detached under ordinary pressure or strain upon it.

I do not desire to limit my invention to the formation of the slot at any particular point of the felly, nor to any particular shape of the opening in the rubber tire to receive the same. The shoulders $h\ h$ being rounded allow the flat strip to be drawn over them freely, and being rigid will sustain the strip even when subjected to great strain, so that the strip may be drawn very tight. While I consider a flat strip the best to use, as it presents a wider bearing-surface on the tire to hold down the edges and prevent it from rolling, yet the metallic block may be formed to accommodate a strip other than flat. The ends of the flat strip are drawn through the slot or opening in a radial line toward the hub, the portions of said strip contained in the slot lying in parallelism, or so that the flat faces touch each other.

I claim—

1. In a wheel, a rubber tire having a passage through it and also having an opening at the inner side communicating with said passage, combined with a flat binding-strip inserted in said passage through the tire, the ends thereof passing through said opening in parallelism without crossing, substantially as described.

2. In a wheel, a rubber tire having a passage through it and a single opening at the inner side communicating with said passage and a rim or felly also having a single opening through it registering with the aforesaid opening in the tire, combined with a flat binding-strip in the passage through the tire, the ends of said strip passing through said openings in parallelism without crossing and thereafter bent to be attached to the rim or felly, substantially as described.

3. The wheel having the tubular or hollow rubber tire, combined with the binding-strip placed in the opening or passage through the tire and having its outer or free ends accessible and the metallic slotted block, through which the ends of the strip pass, substantially as and for the purpose specified.

4. The wheel having the tubular or hollow rubber tire, combined with the binding-strip placed in the opening or passage through the tire and having its outer or free ends accessible and the metallic slotted block, through which the ends of the said strip pass, the said ends also passing through the felly to be secured upon the under side thereof, substantially as described.

5. In a wheel, a rubber tire having a passage through it and an opening at its inner side communicating with said passage and a metallic block in said opening formed with rigid shoulders $h\,h$, combined with a binding-strip inserted in the passage in the tire, the end portions of which are drawn over said rigid shoulders $h\,h$, substantially as described.

6. In a wheel, a rubber tire having a passage through it and an opening at its inner side communicating with said passage and rigid shoulders $h\,h$ with rounded faces in said opening, combined with a binding-strip inserted in the passage in the tire, the end portions of which are drawn over said rounded shoulders $h\,h$, substantially as described.

7. In a wheel, a rubber tire having a passage through it and an opening at its inner side communicating with said passage and rigid shoulders $h\,h$ with rounded faces to constitute transverse bearing-surfaces, combined with a flat binding-strip inserted in the passage in the tire, the end portions of which are drawn over said shoulders, substantially as described.

In testimony whereof I have signed my name to this specification in the presence of two subscribing witnesses.

STERLING ELLIOTT.

Witnesses:
BERNICE J. NOYES,
B. DEWAR.